No. 745,040. PATENTED NOV. 24, 1903.
T. J. COOPER.
PNEUMATIC TIRE.
APPLICATION FILED MAR. 25, 1903.
NO MODEL.
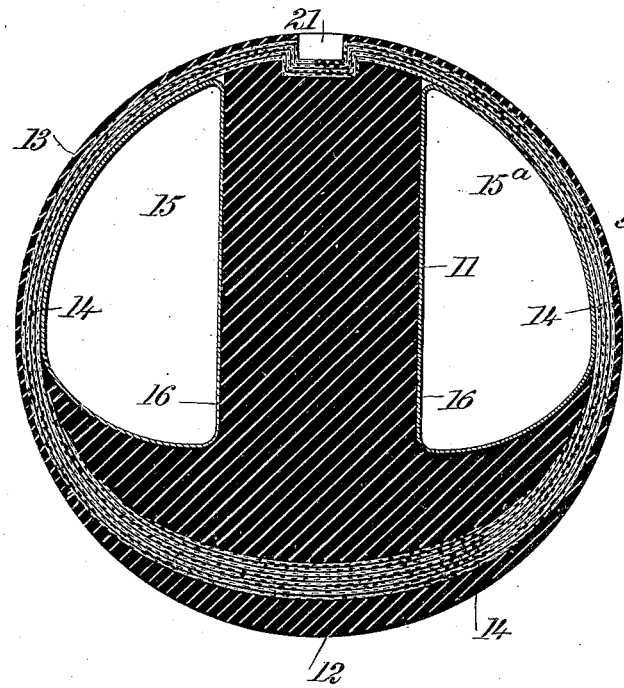
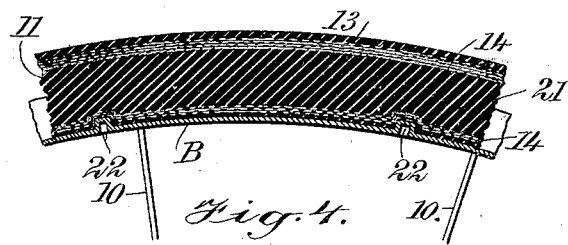
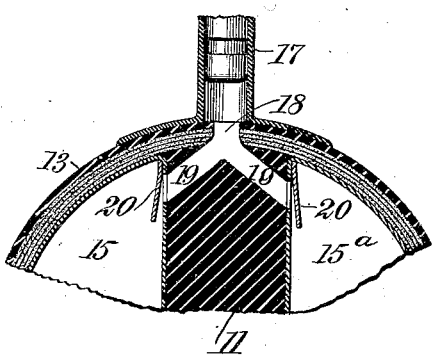
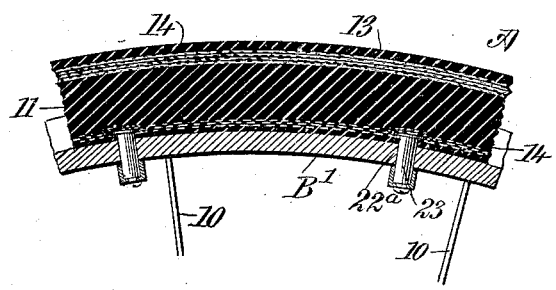
WITNESSES
INVENTOR
Thomas J. Cooper
BY
ATTORNEYS No. 745,040.

Patented November 24, 1903.

UNITED STATES PATENT OFFICE.

THOMAS J. COOPER, OF PATERSON, NEW JERSEY.

PNEUMATIC TIRE.

SPECIFICATION forming part of Letters Patent No. 745,040, dated November 24, 1903.

Application filed March 25, 1903. Serial No. 149,493. (No model.)

*To all whom it may concern:*

Be it known that I, THOMAS J. COOPER, a citizen of the United States, and a resident of Paterson, in the county of Passaic and State of New Jersey, have invented a new and Improved Pneumatic Tire and Rim Therefor, of which the following is a full, clear, and exact description.

The purpose of the invention is to construct a practically punctureless and non-collapsible pneumatic tire and a wheel-rim of metal or wood or other material to which the tire can be expeditiously and conveniently attached without danger of creeping, and to so construct the tire that it will not only be reliable and economic, but whereby two independent air-chambers are provided supplied with air from one inlet-valve, and whereby the inlet-passages of both of the chambers are automatically sealed against leakage.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a transverse section through the improved tire. Fig. 2 is a partial transverse section through the tire and air-supply valve, illustrating the valves for the air-introduction channels, which prevent one air compartment or chamber from leaking should the other by any possibility become fractured. Fig. 3 is a longitudinal section through the central portion of the tire and through a portion of a metal rim for a wheel, illustrating the manner in which the tire and the rim are connected; and Fig. 4 is a section similar to Fig. 3, illustrating the tire applied to a wooden or similar rim.

A represents the improved tire. B in Fig. 3 represents the metal rim of a wheel to which the tire is to be applied, and B' in Fig. 4 represents a wooden or composite rim of a wheel adapted to carry the tire. It will be understood that both forms of rims B and B' are provided with the usual spokes 10.

In the construction of the tire it is usually circular in cross-section and continuous, being of circular form in direction of its length. The said tire is provided with a central longitudinal solid partition 11, constructed of soft rubber or a like elastic material, and the said partition 11, at what may be termed its "outer" end, is made integral with or is in any manner attached to a segmental tread-section 12, forming a portion of the outer surface of the tire A. This segmental tread-section 12 extends sufficiently at the sides of the tire A to be covered at its reduced longitudinal portions by the rim of the wheel to which the tire is applied, or practically so.

The rubber or other elastic material comprising the tread-section 12 is carried externally the full circumference of the tire, as is shown in Fig. 1, and the tire is strengthened by substantially circularly-arranged layers of canvas and rubber and suitable cement, (shown at 14 in the drawings,) and these layers of canvas and rubber and cement, if desired, are brought close together and extend through the tread-section 12 a desired distance from the outer face of the said tread-section, as is also shown in Fig. 1. It will be observed by reference to the same figure that the number of layers of the canvas or reinforcing sections 14 of the tire is increased where said layers pass through the solid-rubber or elastic tread-section 12, so as to strengthen this section to the uttermost extent without detracting from its elasticity.

The outer elastic surface 13 of the tire combining with the partition 11, the tread-section 12, and the reinforcing-section 14 forms two chambers 15 and 15ª, one at each side of the said partition 11, as is illustrated in Figs. 1 and 2, and preferably the walls of these chambers are covered with rubber or canvas 16 or a combination of the two cemented or otherwise secured in place.

The chambers 15 and 15ª are to be inflated with air, as is customary in pneumatic tires; but it will be observed that said chambers 15 and 15ª are independent one of the other, yet the same valve 17 may be employed for simultaneously filling the two chambers with the necessary quantity of air. This valve 17 is shown in Fig. 2 and is connected with an inverted-Y channel comprising an upper shank-section 18 and diverging branch sections 19, the shank-section being in direct communication with the valve, while the branch sections 19 lead one into the chamber 15 and the other into the chamber 15ᵃ. In order that should a fracture occur in one chamber air shall not escape from the other chamber, auxiliary valves 20 are located at the outlets of the branches 19 of the channel connected with the valve 17, and when air is forced into the said channels these valves 20 open, and when a sufficient pressure of air is obtained in the chambers 15 and 15ᵃ such pressure will automatically close the auxiliary valves 20 and keep them closed. Thus it will be observed that should a puncture possibly happen at one side of the tire sufficient to permit of the escape of the air from the chamber at that side the air can escape through said puncture without the possibility of the air in the opposing chamber escaping also, thus preserving sufficient elasticity in the operation of the tire to permit of a vehicle continuing its journey without detrimental results either to the tire or to the rim of the wheel to which the tire is applied.

When the tire A is used in connection with a metal rim B, the tire at what may be termed its "inner" or "bottom" surface is provided with any desired number of recesses 21, and the rim B has outwardly-extending offsets 22 formed thereon, adapted to enter the said recesses 21, and the tire may be cemented to the rim, if so desired; but by reason of the offsets 22 on the rim entering the recesses 21 in the tire the tire will be prevented from creeping upon the rim.

In Fig. 4 I have illustrated a wooden rim B', and in this construction of rim openings 22ᵃ are made in the outer face of the rim to which the tire A is to be applied, and offsets or lugs 23 are secured at one end in the tire A, and said lugs are adapted to enter the openings 22ᵃ, being secured to the rim by cap-nuts or their equivalents. This latter method of the application of the tire to a wooden or composite rim has been found to be more desirable than the application of the rim to the tire shown in Fig. 3; but either form of application may be employed without departing from the spirit of the invention.

Having thus described my invention, I claim as new and desire to secure by Letters Patent—

1. A pneumatic tire provided with independent air-receiving chambers, a valve common to both of said chambers, a partition between the chambers being provided with channels leading from the valve to the said chambers, and auxiliary valves located within the chambers at the outlets of the said channels, the pressure of air in the chambers serving to keep the said auxiliary valves closed, as described.

2. A pneumatic tire, consisting of a circular elastic shell, inner layers of canvas and rubber reinforcing the said shell, a longitudinal, elastic, centrally-located partition, and an elastic tread-section integral with the said partition, whereby two independent chambers are formed for the reception of air, one at each side of the central partition, and a valve for supplying air to the said chambers, the partition having a branch channel in communication with the said valve and with both of the said chambers, as specified.

3. A pneumatic tire, consisting of an outer elastic circular shell, a central elastic partition within said shell, said partition being vertically disposed, and formed with its inner and outer edges integrally united with the inner and outer diameter respectively of the inner wall of said circular shell, an elastic tread-surface integral with the partition and the shell and layers of canvas and rubber arranged in circular form and extending in engagement with the said elastic shell across the said partition, between it and the shell and through the said tread-section, and means, substantially as described, whereby the tire may be applied to and held from creeping upon the surface to which application is made, as set forth.

4. A pneumatic tire, consisting of a circular elastic shell having an integral central vertical partition dividing the inner portion of said shell into two independent longitudinal chambers for the reception of air, the outer edge of said partition merging into a thickened tread-section, the partition having a branch channel in communication with both of said chambers, and a valve for supplying air through said channels to said chambers, as set forth.

5. A pneumatic tire, consisting of an outer elastic shell, a central elastic vertical partition integrally connected at its outer and inner peripheral edges with said shell, said partition merging at its outer edge into a thickened tread portion, layers of canvas and rubber arranged in circular form around said elastic shell and embedded in said tread portion and said vertical partition at its point of union with the inner periphery of the shell, said shell having integral recesses in the inner sides of its outer surface, adapted to be engaged by projections on the rim of a wheel, whereby the tire may be held against creeping on the wheel, as set forth.

In testimony whereof I have signed my name to this specification in the presence of two subscribing witnesses.

THOMAS J. COOPER.

Witnesses:
J. FRED. ACKER,
JNO. M. RITTER.